Dec. 19, 1922.
T. C. DOBBINS ET AL.
RESILIENT ATTACHMENT FOR VEHICLES.
FILED MAY 15, 1920.
1,439,617.
2 SHEETS—SHEET 1.
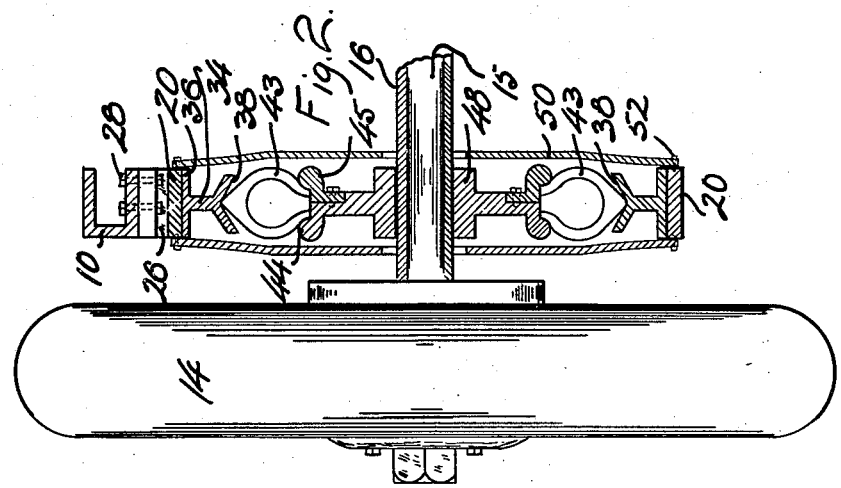
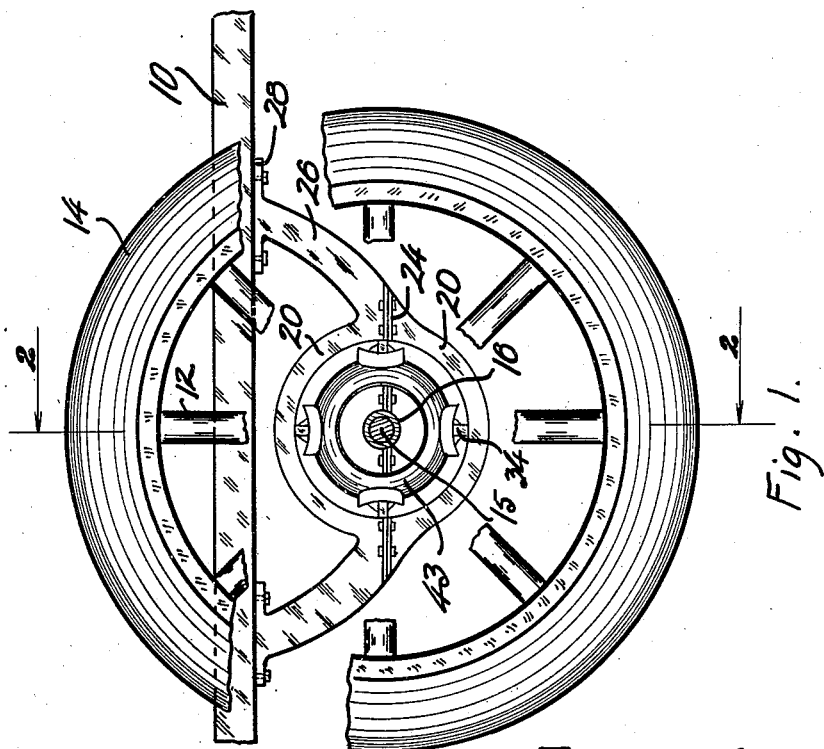
Inventors
Timothy C. Dobbins
David H. Roby
By
Attorney

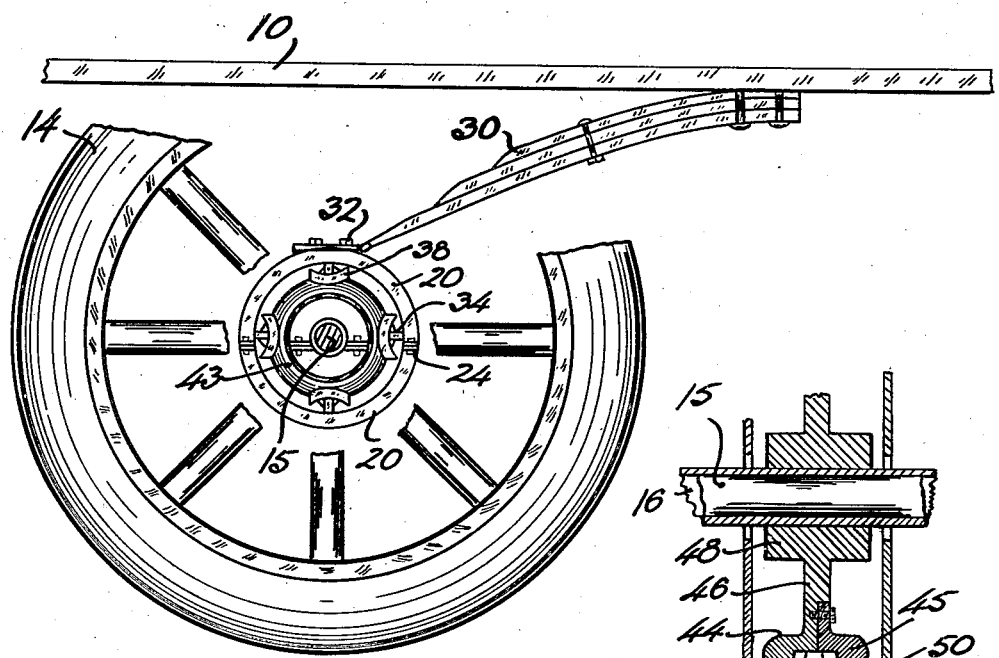
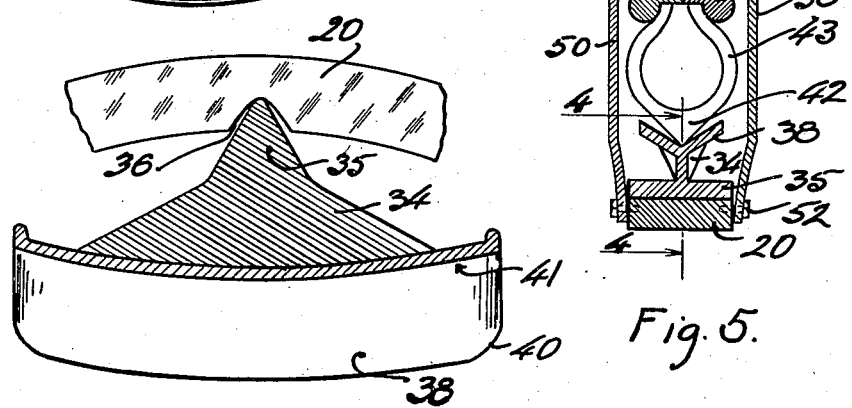

Patented Dec. 19, 1922.

1,439,617

UNITED STATES PATENT OFFICE.

TIMOTHY C. DOBBINS, OF LOS ANGELES, CALIFORNIA, AND DAVID H. ROBY, OF DENVER, COLORADO.

RESILIENT ATTACHMENT FOR VEHICLES.

Application filed May 15, 1920. Serial No. 381,705.

*To all whom it may concern:*

Be it known that we, TIMOTHY C. DOBBINS and DAVID H. ROBY, citizens of the United States, residing at the city and county of Los Angeles, California, and the city and county of Denver and State of Colorado, respectively, have invented certain new and useful Improvements in Resilient Attachments for Vehicles; and we do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a resilient device, by means of which it will be possible to eliminate springs from a vehicle, if desired.

Briefly, the invention comprises a small rim member adapted to be mounted upon an axle housing, said rim member carrying a small pneumatic tube upon the tread of which there rests a plurality of shoes shaped to engage over the circumference of the tube, these shoes being rockingly mounted on the inner face of a casing. The casing is connected with the chassis of the vehicle. By this construction the small pneumatic tube takes up the shock or vibration and performs all the functions of springs.

In the drawings:

Fig. 1 is an elevation showing the device in operative position with respect to a chassis, an axle and a wheel, the hub portion of the wheel being broken away.

Fig. 2 is a view indicated by line 2—2 of Fig. 1, showing the invention in vertical section.

Fig. 3 is a view similar to that of Fig. 1, showing a slight modification of mounting.

Fig. 4 is a detail indicated in general by line 4—4 of Fig. 5.

Fig. 5 is an enlarged sectional detail, as in Fig. 2.

The drawings show a chassis 10, a wheel having spokes 12, and a tire 14, and an axle 15 with its housing 16. A casing 20 is provided in two parts, having flanges adapted to be bolted together as indicated at 24. The upper part of the casing 20 may be provided with integral arms 26, bolted to the chassis at 28, as in Fig. 1, or if greater resilience is desired, the casing may be connected with a spring 30, as at 32, said spring being mounted on the chassis in any well known manner. A plurality of shoes or rockers 34 are mounted within the casing, each shoe having a V-shape bearing part 35 fitted into a V-shaped notch 36 in the casing, which notch is of slightly greater angle than the bearing 35 and permits rocking of said bearing 35. The rocker bearings 35 extend transversely of the device while the face 38 of each shoe extends at right angles thereto, said face 38 being of V-shaped form to provide a bearing. The corners of the face 38 are rounded as shown at 40, while the bottom or apex of the V is indicated at 41, Fig. 4.

The bearing face 38 is adapted to receive the tread 42 of a casing 43, which is adapted to retain a pneumatic tube. The tread 42 is constructed in angular form as shown, this angle being somewhat less than the angle of the V-shaped bearing face 38, so that the apex of the tread will engage in the bottom or apex of the V-shaped face 38. In this manner, when the shock or the load of the vehicle causes compression of the shoe upon the tread of the casing 43, said tread will flatten gradually until it engages the face 38 throughout when under maximum load conditions. The casing 43, is built according to standard form at its inner edges, whereby it may be mounted upon a rim 44 having a removable side 45, which parts are carried upon a web 46, integral with a hub 48, mounted upon the axle housing 16. This mounting is sufficiently loose that the tire or tube 43, with its rim 44, may creep during operation, and is also such that the weight of the car is supported upon the axle housing, in much the same way as the springs are mounted at present. In order to close the working parts to exclude dirt and the like, side plates 50 are bolted on, as indicated at 52.

In operation, the weight of the car upon the chassis 10 is transmitted by means of the arms 26, or the spring 30, as the case may be, to the housing 20, and through the medium of the shoes to the small pneumatic tube 43, whereby the weight of the car is transmitted to the small rim 44, and thence to the axle housing 16. The shoes are elongated as shown, so that the bearing faces 38 provide a large bearing surface. Thus the air pressure within the tube 43 may be comparatively low, and the entire weight of the car will be taken up thereby. The limited amount of movement permitted at the rocking point 36 gives ease of operation and also permits very slight creeping of the tube 43.

By this construction, shocks are absorbed with great efficiency, so that springs may be entirely eliminated. However, if additional resilience is desired, the device may be used in conjunction with springs.

I claim:

1. In combination, a chassis, an axle, a casing connected with the chassis and disposed about the axle, shoes mounted on the inner side of the periphery of the casing, a rocking connection between said casing and said shoes, a rim rotatably supported by the axle, and a pneumatic tube upon the rim engaged by said shoes.

2. In combination, a chassis, an axle, a casing connected with the chassis and disposed about the axle, shoes pivotally mounted on the inner side of the periphery of the casing, a rim supported by the axle, a pneumatic tube upon the rim engaged by said shoes, the tread of the tube being V-shape, and the engaging faces of said shoes being V-shape.

3. In combination, a chassis, an axle, a casing connected with the chassis and disposed about the axle, shoes in the casing, a pneumatic tube within the casing and about the axle, said shoes engaging the tube, whereby the chassis is supported upon the axle through the medium of the tube, the tread of the tube being V-shape, and the engaging faces of said shoes being V-shape, the angle of the tread being less than that of the shoes.

4. In combination, a chassis, an axle, a casing connected with the chassis and disposed about the axle, a plurality of shoes in the casing and rockingly connected thereto, and a pneumatic tube within the casing and about the axle, said shoes engaging the tube, whereby the chassis is supported upon the axle through the medium of the tube, said shoes having a peripheral curvature.

5. In combination, a chassis, an axle, a casing connected with the chassis and disposed about the axle, a plurality of shoes in the casing, and a pneumatic tube within the casing and about the axle, said shoes engaging the tube, whereby the chassis is supported upon the axle through the medium of the tube, said shoes having a circumferential curvature, and being rockingly mounted in the casing.

6. In combination, a chassis, an axle, a casing connected with the chassis and disposed about the axle, a plurality of shoes in the casing and rockingly connected therewith, and a pneumatic tube within the casing and about the axle, said shoes engaging the tube, whereby the chassis is supported upon the axle through the medium of the tube, the tread of the tube having a contour of smaller dimensions than those of the engaging faces of the shoes whereby the area of contact will increase as the load increases.

7. In a resilient device, a casing, a hub within the casing, the hub and the casing being adapted for mounting on relatively movable members, shoes within the casing, a pneumatic tube within the casing whose tread is in engagement with shoes, the tread of the tube being V-shape, and the engaging faces of the shoes being V-shape.

8. In a resilient device, a casing, a hub within the casing, the hub and the casing being adapted for mounting on relatively movable members, shoes within the casing, a pneumatic tube within the casing whose tread is in engagement with shoes, the tread of the tube being V-shape, and the engaging faces of the shoes being V-shape, the angle of the tread being smaller than that of the faces.

9. In a resilient device an axle, a casing, a hub within the casing and rotatably mounted on the axle, a plurality of shoes rockably connected to said casing, a pneumatic tube carried by said hub member and engaging said shoes, the shoes having the surface which engages the surface of the pneumatic tube curved with respect to the tube in such a manner that the two surfaces diverge from the point of contact.

In testimony whereof we affix our signatures.

TIMOTHY C. DOBBINS.
DAVID H. ROBY.